(12) United States Patent
Alasirniö et al.

(10) Patent No.: US 10,890,733 B2
(45) Date of Patent: Jan. 12, 2021

(54) IMAGE SENSOR MODULE WITH AUTO FOCUS CONTROL

(71) Applicant: ams Sensors Singapore Pte. Ltd., Singapore (SG)

(72) Inventors: Jukka Alasirniö, Jääli (FI); Kyu Won Hwang, Singapore (SG); Hartmut Rudmann, Jona (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 0 days.

(21) Appl. No.: 15/564,255

(22) PCT Filed: Apr. 5, 2016

(86) PCT No.: PCT/SG2016/050167
§ 371 (c)(1),
(2) Date: Oct. 4, 2017

(87) PCT Pub. No.: WO2016/163953
PCT Pub. Date: Oct. 13, 2016

(65) Prior Publication Data
US 2018/0136434 A1    May 17, 2018

Related U.S. Application Data (60) Provisional application No. 62/143,320, filed on Apr. 6, 2015, provisional application No. 62/250,626, filed on Nov. 4, 2015.

(51) Int. Cl.
*H04N 5/225* (2006.01)
*G02B 7/09* (2006.01)
(Continued)

(52) U.S. Cl.
CPC ............... *G02B 7/09* (2013.01); *G02B 7/023* (2013.01); *G03B 3/10* (2013.01); *G03B 17/12* (2013.01);
(Continued)

(58) Field of Classification Search
CPC .................................................. H01L 27/14625
See application file for complete search history.

(56) References Cited

U.S. PATENT DOCUMENTS 8,325,265 B2   12/2012   Chen
9,768,361 B2    9/2017   Riel et al.
(Continued)

FOREIGN PATENT DOCUMENTS

JP     2006-243351    9/2006
WO     2015/041602    3/2015

OTHER PUBLICATIONS

International Search Report and Written Opinion issued by ISA/AU for PCT/SG2016/050167 (dated May 30, 2016).

*Primary Examiner* — Twyler L Haskins
*Assistant Examiner* — Dwight Alex C Tejano
(74) *Attorney, Agent, or Firm* — Michael Best and Friedrich LLP (57) ABSTRACT

The present disclosure describes image sensor modules that can include auto focus control. The modules also include features that can help reduce or eliminate tilt of the module's optical sub-assembly with respect to the plane of the image sensor. In some instances, the modules include features to facilitate highly precise positioning of the optical sub-assembly, and also can result in modules having a very small z height.

25 Claims, 7 Drawing Sheets

(51) Int. Cl.
*G03B 3/10* (2006.01)
*G03B 17/12* (2006.01)
*G02B 7/02* (2006.01)

(52) U.S. Cl.
CPC ......... *H04N 5/2253* (2013.01); *H04N 5/2254* (2013.01)

(56) References Cited

U.S. PATENT DOCUMENTS

| | | | |
|---|---|---|---|
| 2005/0163016 A1* | 7/2005 | Kimura | G02B 13/001 369/112.01 |
| 2006/0125925 A1* | 6/2006 | Lee | G02B 7/08 348/208.12 |
| 2006/0133794 A1* | 6/2006 | Chen | G03B 9/02 396/268 |
| 2006/0257131 A1* | 11/2006 | Yoon | G02B 7/08 396/133 |
| 2007/0165131 A1* | 7/2007 | Ish-Shalom | G02B 13/001 348/345 |
| 2008/0174690 A1* | 7/2008 | Chang | G02B 7/102 348/345 |
| 2008/0192124 A1* | 8/2008 | Nagasaki | G02B 7/02 348/208.11 |
| 2009/0015706 A1* | 1/2009 | Singh | G03B 17/00 348/340 |
| 2009/0033789 A1* | 2/2009 | Lin | G02B 7/02 348/374 |
| 2009/0278978 A1* | 11/2009 | Suzuki | G02B 7/08 348/345 |
| 2010/0033616 A1* | 2/2010 | Huang | G02B 7/021 348/335 |
| 2010/0039553 A1* | 2/2010 | Kim | H04N 5/2254 348/374 |
| 2010/0110270 A1* | 5/2010 | Sekimoto | H04N 5/2254 348/340 |
| 2013/0128100 A1* | 5/2013 | Son | H04N 5/2254 348/357 |
| 2016/0241749 A1* | 8/2016 | Alasimio | H04N 5/2257 |
| 2017/0012069 A1 | 1/2017 | Rudmann et al. | |

\* cited by examiner

IMAGE SENSOR MODULE WITH AUTO FOCUS CONTROL

FIELD OF THE DISCLOSURE

This disclosure relates to compact image sensor modules with auto focus control.

BACKGROUND

Various electronic and other consumer products such as mobile phones include a camera. Manufacturing specifications of the mobile phone or other device often require that the dimensions of the camera be very small, while still facilitating high-quality pictures. Other types of electronic devices also include miniature cameras.

High quality cameras often include focus control and some cameras, such as those in mobile phones, include automated focus control, sometimes referred to as autofocus control. Autofocus control allows the object of interest to be brought into focus automatically before taking the picture and can be achieved by moving a lens barrel that adjusts the position of the lens relative to the image sensor. In some cases, a voice coil motor (VCM) is provided to facilitate the autofocus control.

Some autofocus cameras (e.g., those having a pixel array size of at least 8 Mpix) require active alignment. In addition to autofocus functions, the VCM can be used for active alignment to compensate, for example, for tilt between a center axis of the lens barrel and the image sensor. Thus, in some instances the VCM is adjusted along multiple axes so as to align the lens assembly to the image sensor. Unfortunately, such active alignment tends be slow and costly.

SUMMARY

The present disclosure describes image sensor modules that can include auto focus control. The modules also include features that can help reduce or eliminate tilt of the module's optical sub-assembly with respect to the plane of the image sensor. In some instances, the modules include features to facilitate highly precise positioning of the optical sub-assembly, and also can result in modules having a very small z height.

For example, in one aspect, an image sensor module includes an image sensor, and a lens barrel sub-assembly having an optical sub-assembly disposed inside a lens barrel housing. A spacer separates the lens barrel sub-assembly from the image sensor, is fixedly attached to the lens barrel sub-assembly and rests directly on an inactive area of the image sensor. An actuator is operable to adjust a position of the optical sub-assembly inside the lens barrel housing.

In another aspect, an image sensor module includes an image sensor, a lens barrel housing, and an optical sub-assembly disposed inside the lens barrel housing and disposed over the image sensor along a first axis. Outer walls laterally surround the image sensor. The module includes a first spacer separating the lens barrel housing from the outer walls along the first axis, wherein the first spacer is fixedly attached to the lens barrel housing and to the outer walls. The module further includes a second spacer separating the optical sub-assembly from the image sensor along the first axis, wherein the second spacer is fixedly attached to the optical sub-assembly but not to the image sensor. An actuator is operable to adjust a position of the optical sub-assembly inside the lens barrel housing.

In yet a further aspect, a method of manufacturing an image sensor module includes providing a lens barrel sub-assembly having an optical sub-assembly disposed inside a lens barrel housing and having an actuator operable to adjust a position of the optical sub-assembly inside the lens barrel housing. The lens barrel sub-assembly, which includes a spacer, is attached to a spacer assembly to form a combined assembly. The method includes mounting the combined assembly to an image sensor sub-assembly that includes an image sensor on a printed circuit board, wherein the spacer assembly separates the lens barrel sub-assembly from the image sensor assembly, and wherein the spacer assembly includes a spacer that rests directly on an inactive area of the image sensor. The actuator then is operated to adjust a position of the optical sub-assembly inside the lens barrel housing.

According to another aspect, a method of manufacturing an image sensor module includes mounting a lens barrel housing on walls laterally surrounding an image sensor, wherein a first spacer separates the lens barrel housing from the walls along a first axis, and wherein the first spacer is fixedly attached to the walls. The method also includes mounting an optical sub-assembly on an inactive area of the image sensor, wherein a second spacer separates the optical sub-assembly from the image sensor along the first axis, and wherein the second spacer is fixedly attached to the optical sub-assembly but not to the image sensor. The actuator then is operated to adjust a position of the optical sub-assembly inside the lens barrel housing.

Other aspects, features and advantages will be readily apparent from the following detailed description, the accompanying drawings and the claims.

DETAILED DESCRIPTION

The present disclosure describes small footprint camera modules with auto focus control. The modules can be used with single channel or array (i.e., multi-channel) cameras. As described in greater detail below, the autofocus control can be integrated, for example, into an assembly that includes an optical assembly, a cover glass and focal length (FFL) correction features and/or tilt correction features. The autofocus control can help achieve, for example, focusing, zooming and/or image stabilization.

Figure 1:
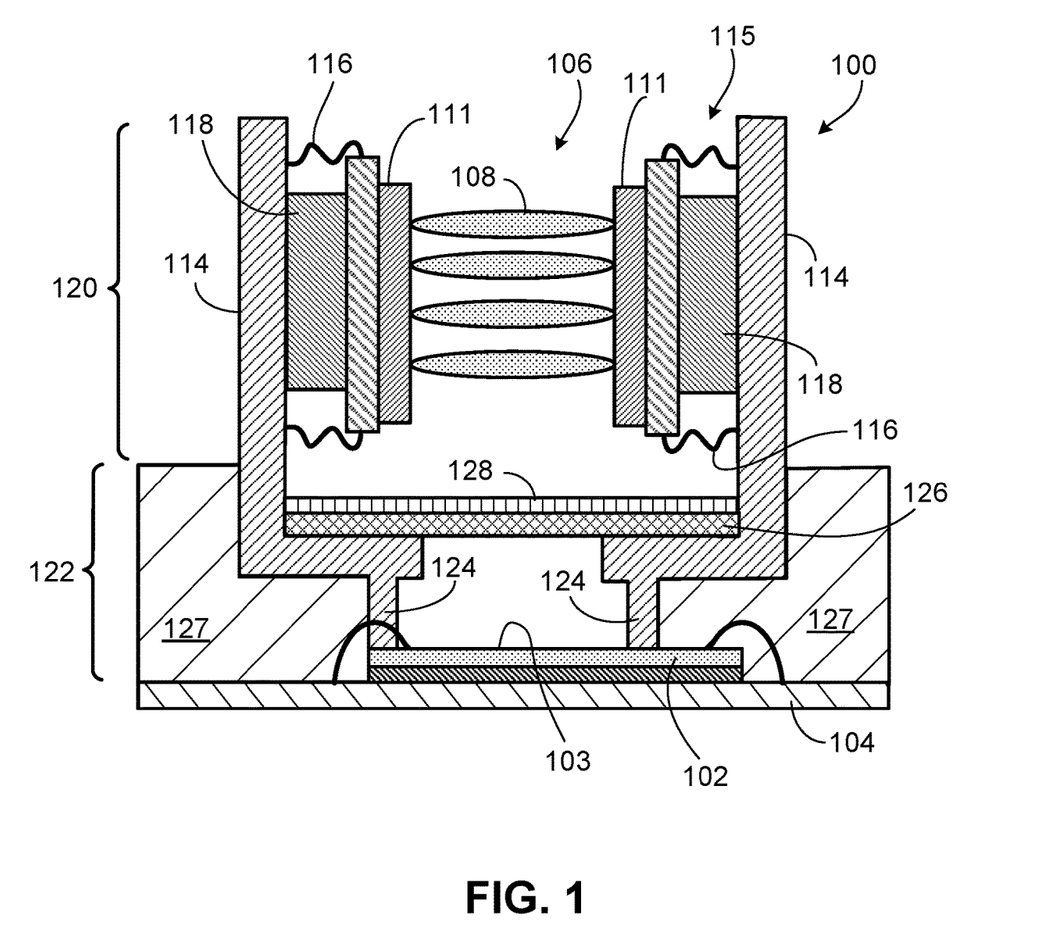
FIG. 1 illustrates an example of an image sensor module.

As illustrated in FIG. 1, an image sensor module 100 can provide ultra-precise and stable packaging for an image sensor 102 mounted on a substrate 104 such as a printed circuit board (PCB). The image sensor 102 includes an array of active elements (i.e., pixels) 103 each of which is sensitive to electromagnetic radiation (e.g., RGB and/or infrared). The image sensor 102 can be implemented, for example, as CCDs or photodiodes.

In the illustrated example, an optical sub-assembly 106 that includes a stack of one or more optical beam shaping elements such as lenses 108 is disposed over the image sensor 102. The lenses 108 can be disposed, for example, within a lens barrel 111 in a lens barrel housing 114. The lens barrel housing 114 can be, for example, an elongated tubular structure within which the optical sub-assembly 106 is mounted. Together, the lens barrel housing 114 and optical sub-assembly 106 form a first sub-assembly 120, which can be referred to as a lens barrel sub-assembly.

Movement of the optical sub-assembly 106 (e.g., for auto-focus control) can be accomplished, for example, by using an electromagnetic actuator 115 such as a VCM integrated into the lens barrel housing 114. In some cases, the actuator 115 includes springs 116 and a magnet 118. In some instances, the actuator 115 can include one or more electrically conductive pins, voice coils, piezoelectric components, and/or electromagnetic components. In some instances, movement of the optical sub-assembly 106 can be accomplished using a MEMS device (e.g., a MEMS electrostatic actuator). Movement of the actuator can allow the distance between the lenses 108 in the optical assembly 106 and the image sensor 102 to be adjusted, for example, by as much as several tens of microns (e.g., +20 μm).

The lens barrel sub-assembly 120 is attached (e.g., by adhesive) to a second sub-assembly 122 that includes one or more vertical spacers 124. The second sub-assembly 122, which can be referred to as a spacer sub-assembly, can further include a transparent substrate 126 and an optical filter 128 that selectively allows radiation of particular wavelength or range of wavelengths (visible or IR) to pass from the optical sub-assembly 106 to the image sensor 102. The cover 126 can be composed, for example, of glass or another inorganic material such as sapphire that is transparent to wavelengths detectable by the image sensor 102. The vertical spacers 124, which can be composed, for example, of a material that is substantially opaque for the wavelength(s) of light detectable by the image sensor 102, are in direct contact with inactive regions of the image sensor 102. The spacer(s) 124 can be formed, for example, as a single continuous annular or semi-annular protrusion or as one or more protrusions (e.g., columns or studs). Outer walls 127 laterally surround the spacer(s) 124 and are attached (e.g., by adhesive) to the sensor-side of the PCB 104.

Figure 2A:
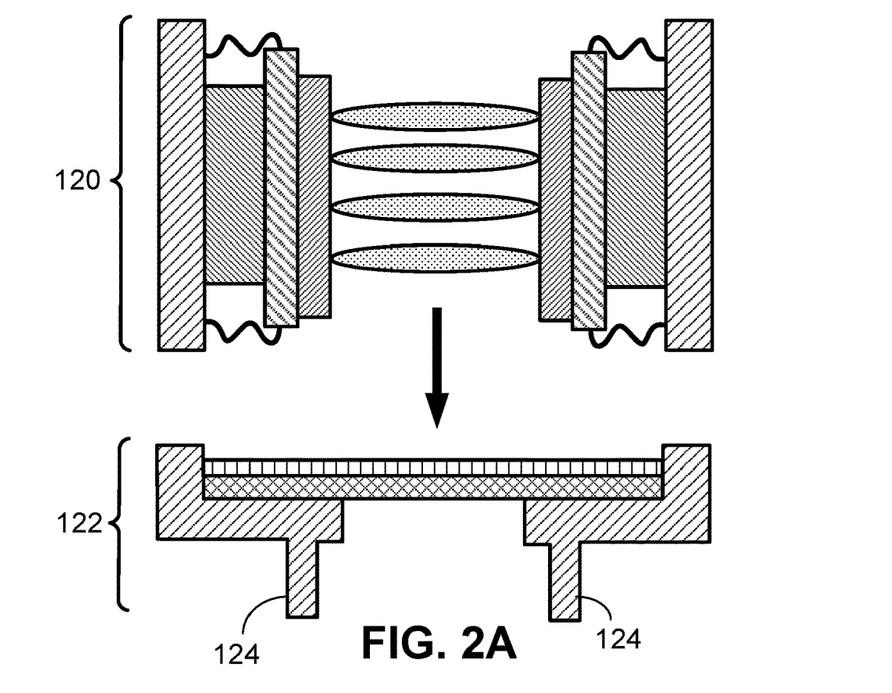
FIGS. 2A-2C show example stages in the fabrication of the image sensor module of FIG. 1.
Figure 2B:
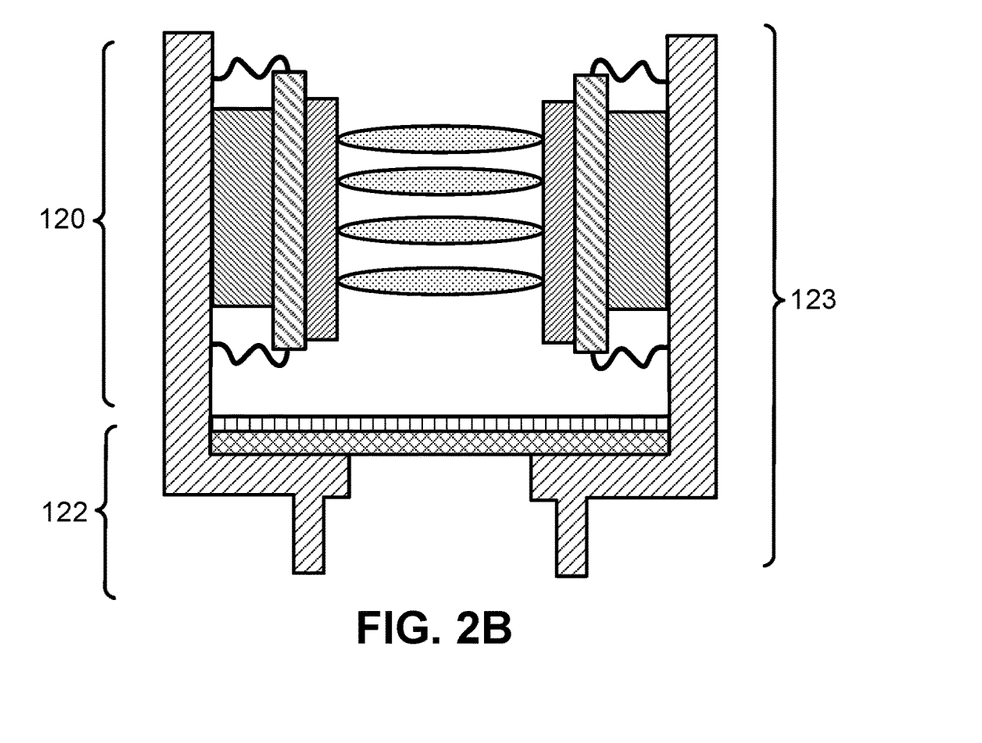

During fabrication of the module 100, and prior to attaching the two sub-assemblies 120, 122 together (see FIG. 2A), the length of the vertical spacers 124 can be adjusted, as needed, to correct for tilt that may otherwise occur between the optical axis of the optical sub-assembly 106 and the plane of the image sensor 102. Such adjustment can be performed, for example, by micromachining, cutting, dicing or grinding the free end(s) of the spacers 124. The two sub-assemblies 120, 122 then are attached to one another as shown in FIG. 2B, and the combined assembly 123 is mounted on the PCB/image sensor sub-assembly 125 (see FIG. 2C). The spacer(s) 124 can be in direct contact (i.e., without adhesive) with inactive areas of the image sensor 102. Supporting the spacer(s) 124 directly on the image sensor 102 without adhesive can help eliminate or reduce tilt between the optical sub-assembly 106 and the plane of the image sensor. The actuator 115 then can be used to adjust the position of the optical sub-assembly 106 within the lens barrel housing 114 so that the focal-length of the lenses 108 is properly focused on the surface of the image sensor 102.

Figure 2C:
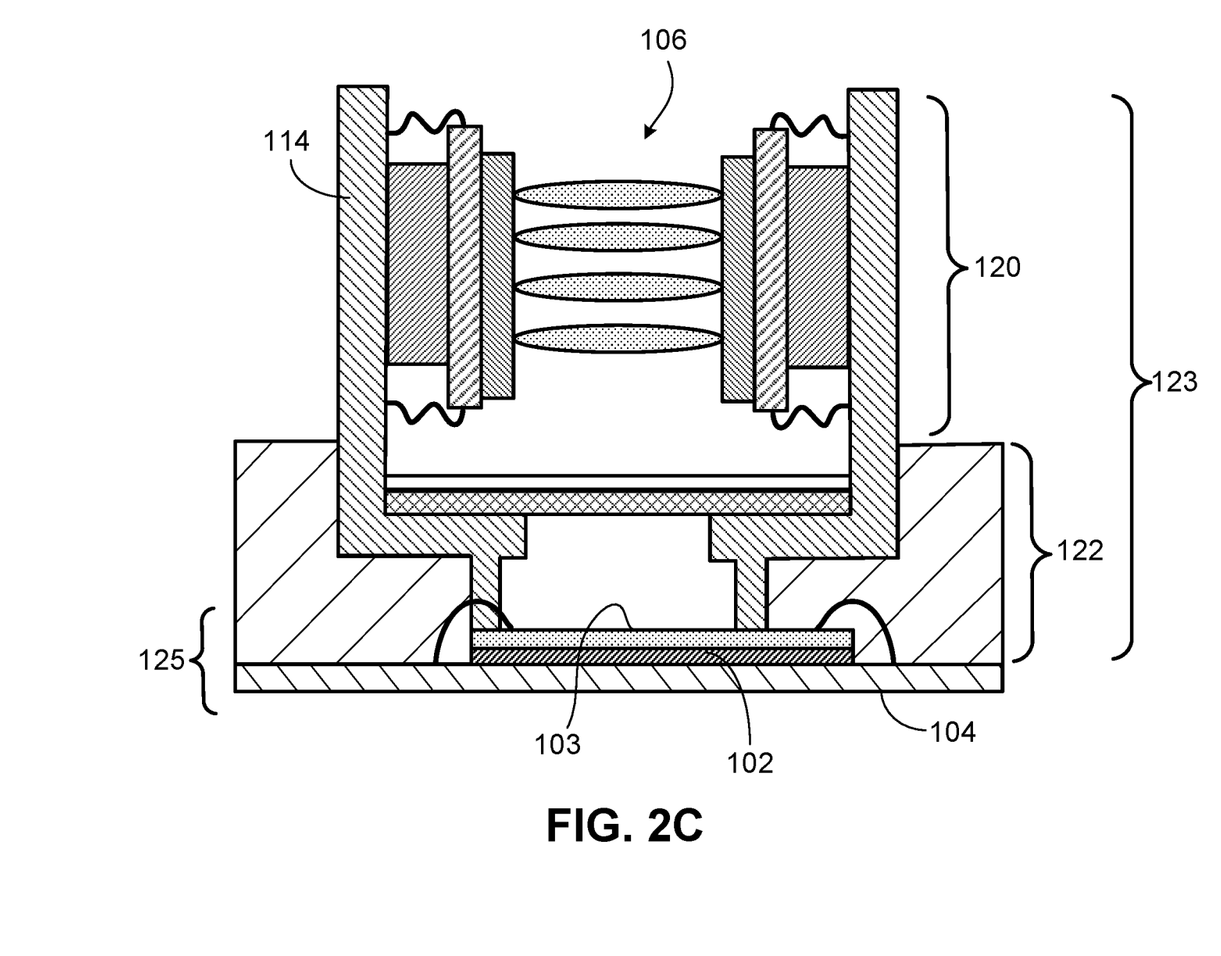

In some cases, the outer walls are formed (e.g., by a dam and fill process) after the combined assembly 123 is attached to the PCB/image sensor sub-assembly 125. In other instances, the outer walls can be formed integrally as part of the spacer(s) 124 (e.g., by vacuum injection or injection molding).

Figure 3:
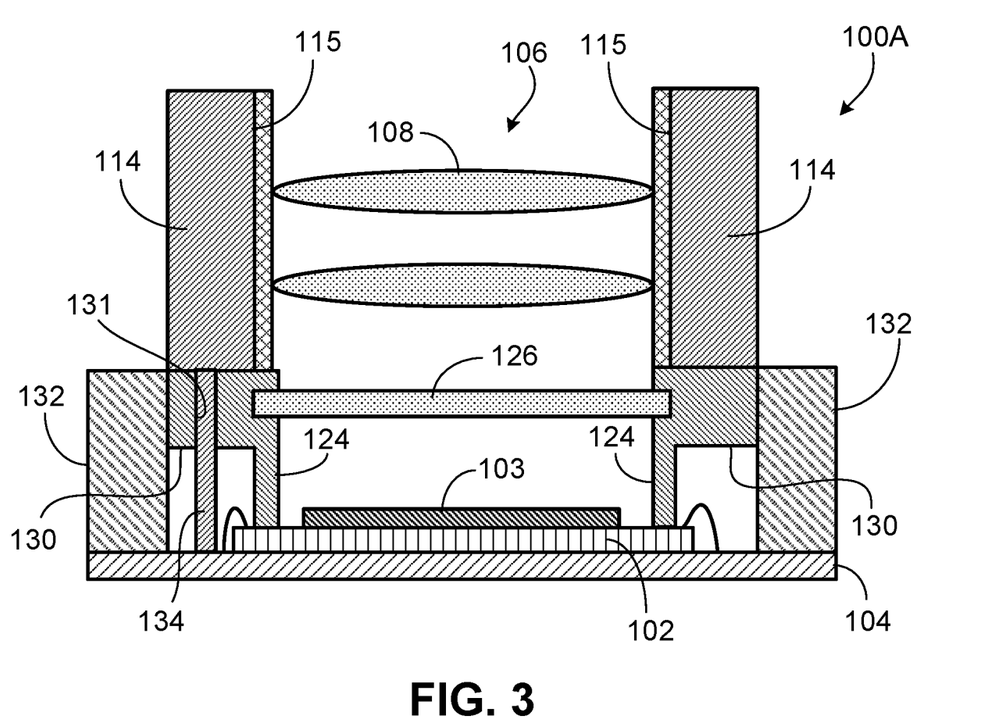
FIG. 3 illustrates another example of an image sensor module.

FIG. 3 shows another implementation of an image sensor module 100A. Some features are similar to those described in connection with the example of FIG. 2. Further, the module 100A includes one or more horizontal spacers 130 laterally surrounding the transparent cover 126 and separating outer walls 132 of the module housing from the transparent cover 126. In some cases, the horizontal spacers 132 can be formed integrally as a unitary piece with the vertical spacers 124. The outer walls 132 can be attached, for example, by adhesive to the image sensor-side of the PCB 104. Adhesive also can be provided, for example, between the side edges of the horizontal spacers 130 and the housing sidewalls 132. An example of a suitable adhesive is a UV-curable epoxy.

The vertical and horizontal spacers 124, 130 can be composed, for example, of a material that is substantially opaque for the wavelength(s) of light detectable by the image sensor 102. The spacers 124, 130 can be formed, for example, by a vacuum injection technique followed by curing. Embedding the side edges of the transparent cover 126 within the opaque material of the horizontal spacers 130 can be useful in preventing stray light from impinging on the image sensor 102. The outer walls 132 can be formed, for example, by a dam and fill process.

As shown in the implementation of FIG. 3, the horizontal spacer 130 can have one or more through-holes 131, each of which accommodates an electrically conductive pin 134 to provide electrical connection between the actuator 115 and the PCB 104. The through-hole(s) 131 in the spacer 130 can be formed, for example, by laser drilling or micromachining.

Figure 4:
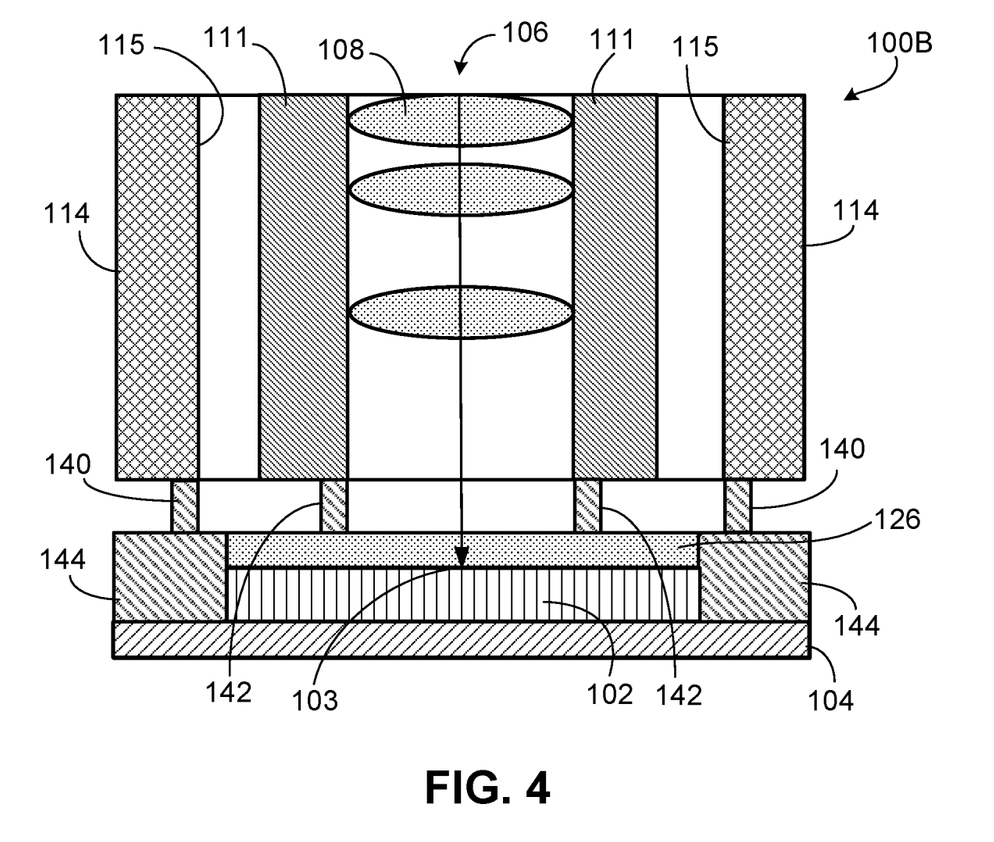
FIG. 4 illustrates yet another example of an image sensor module.

In some implementations, one or more vertical spacer(s) can be provided for the optical sub assembly 106 in addition to the vertical spacer(s) provided for the lens barrel housing 114. FIG. 4 illustrates an example of such a module 100B. In this example, one or more spacers 140 are provided on the sensor-side of the lens barrel housing 114, and one or more spacers 142 are provided on the sensor-side of the lens barrel 111 that forms part of the optical sub-assembly 106. The lens barrel housing spacers 140 can be attached (e.g., by adhesive) to outer walls 144 that laterally surround the image sensor 102. The optical sub-assembly spacers 142 can be in direct contact (i.e., without adhesive) with the transparent cover 126 disposed over the image sensor. In the event no cover 126 is present, then the optical assembly spacers 142 can be in direct contact with inactive areas of the image sensor 102. The optical sub-assembly spacer 142 can include a continuous annular or semi-annular protrusion, or can include a multitude of protrusions (e.g., shaped as columns or studs). In some cases, the illustrated arrangement can facilitate highly precise positioning of the optical sub-assembly 106 within the lens barrel housing 114, and also can result in a module having a very small z height.

Figure 5A:
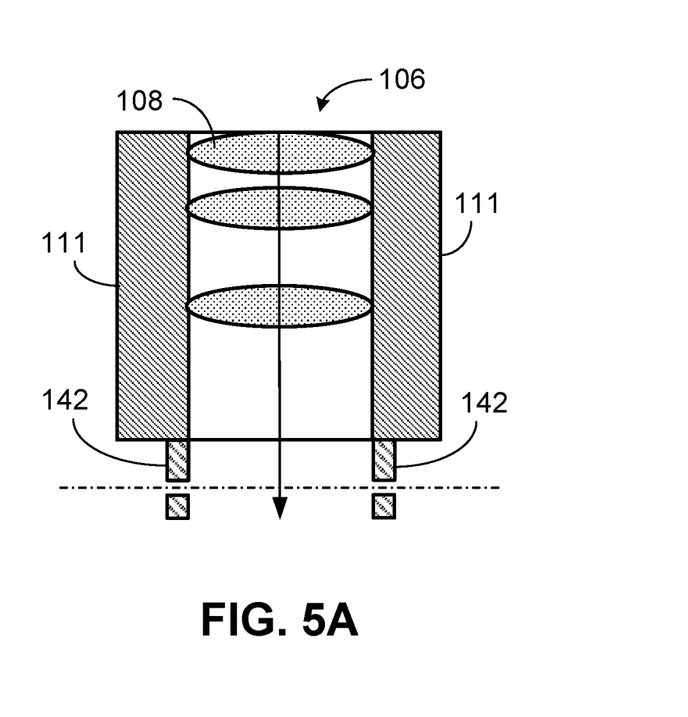
FIGS. 5A-5C show example stages in the fabrication of the image sensor module of FIG. 5.
Figure 5B:
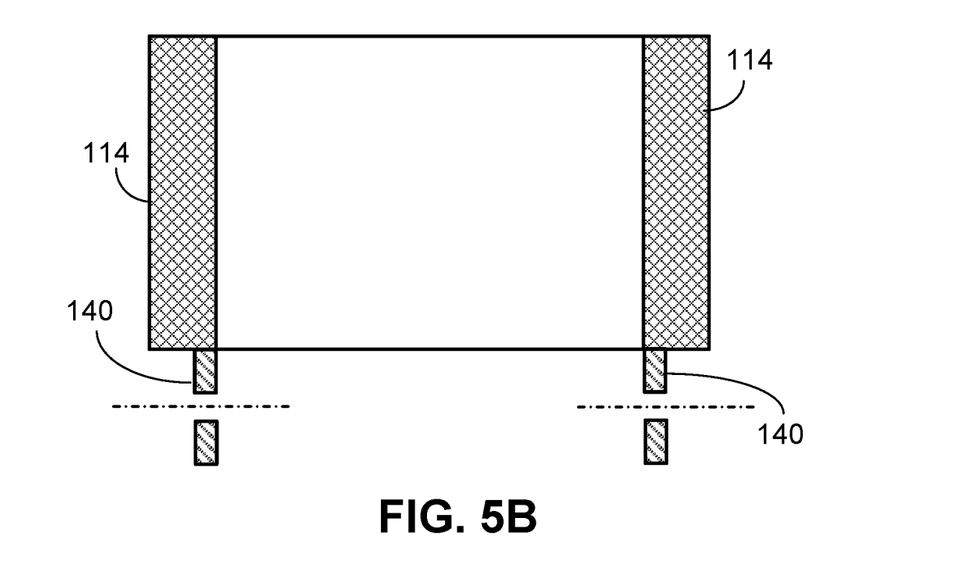
Figure 5C:
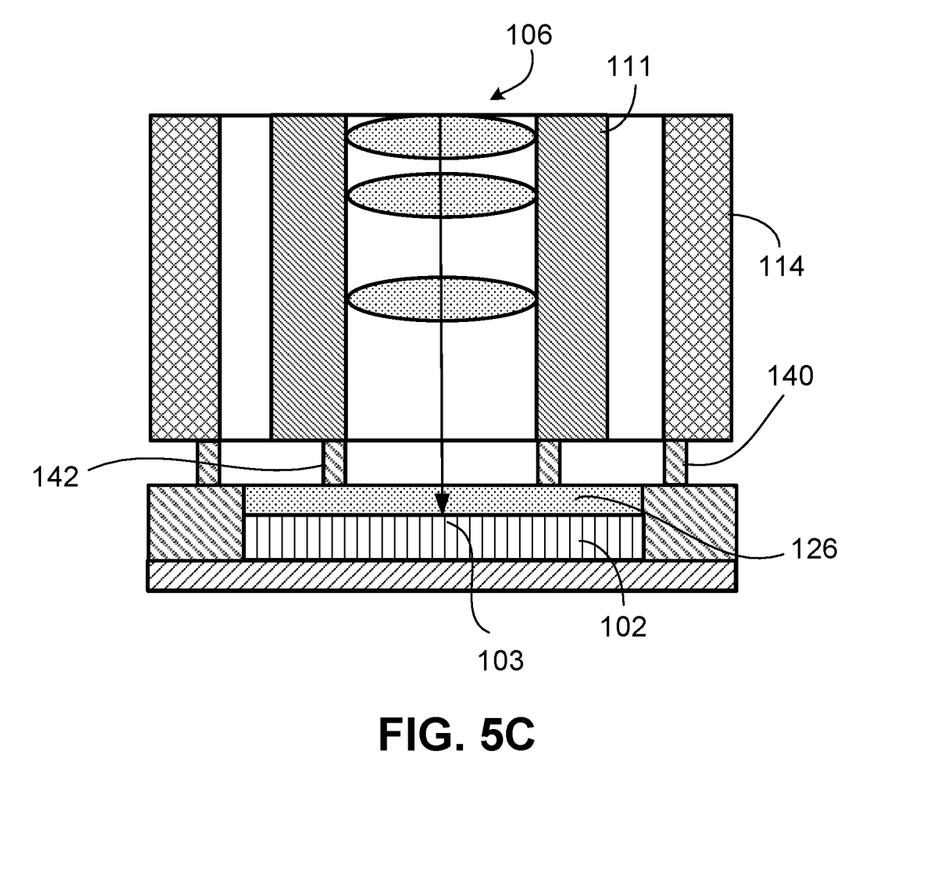

During fabrication of the module 100B, and prior to placing the optical sub-assembly 106 on the image sensor 102, the length of the optical sub-assembly spacers 142 can be adjusted, as needed, to correct for tilt that may otherwise occur between the optical axis of the optical sub-assembly 106 and the plane of the image sensor 102 (see FIG. 5A). Likewise, prior to attaching the lens barrel housing 114 over the image sensor, the length of the lens barrel housing spacers 140 can be adjusted, as needed, to correct for tilt present in the barrel (see FIG. 5B). Such adjustments can be performed, for example, by micromachining, cutting, dicing or grinding the free end(s) of the spacers. Next, the lens barrel housing 14 and optical sub-assembly 106 are mounted on the image sensor 102 (see FIG. 5C). The actuator 115 can be used to adjust the position of the optical sub-assembly 106 within the lens barrel housing 114 so that the focal-length of the lenses 108 is properly focused on the plane of the image sensor 102.

Various modifications can be made within the spirit of the foregoing description. Further, in some cases, features described in connection with the different implementations above can be combined in the same implementation. Accordingly, other implementations are within the scope of the claims.

What is claimed is:

1. An image sensor module comprising:
a lens barrel sub-assembly including an optical sub-assembly disposed inside a lens barrel housing;
an image sensor;
a spacer separating the lens barrel sub-assembly from the image sensor, wherein the spacer is fixedly attached by adhesive directly to the lens barrel housing and rests directly on an inactive area of the image sensor; and
an actuator operable to adjust a position of the optical sub-assembly inside the lens barrel housing;
wherein the spacer includes a multitude of protrusions.

2. The image sensor module of claim 1 wherein the spacer includes a continuous annular protrusion.

3. The image sensor module of claim 1 wherein the protrusions are shaped as columns or studs.

4. The image sensor module of claim 1 further including:
outer walls laterally surrounding the spacer; and
a printed circuit board over which the image sensor is mounted,
wherein the outer walls are fixedly attached to the printed circuit board.

5. The image sensor module of claim 1 further including:
a printed circuit board over which the image sensor is mounted; and
a pin extending through a portion of the spacer, wherein the pin provides an electrically conductive connection between the actuator and the printed circuit board.

6. The image sensor module of claim 1 wherein the actuator is operable to obtain a lens focus position for the optical sub-assembly.

7. An image sensor module comprising:
an image sensor;
a lens barrel housing;
an optical sub-assembly disposed inside the lens barrel housing and disposed over the image sensor along a first axis;
outer walls laterally surrounding the image sensor;
a first spacer separating the lens barrel housing from the outer walls along the first axis, wherein the first spacer is fixedly attached to the lens barrel housing and is fixedly attached by adhesive to the outer walls laterally surrounding the image sensor;
a second spacer separating the optical sub-assembly from the image sensor along the first axis, wherein the second spacer is fixedly attached by adhesive to the optical sub-assembly but not to the image sensor; and
an actuator operable to adjust a position of the optical sub-assembly inside the lens barrel housing.

8. The image sensor module of claim 7 wherein the second spacer rests directly on an inactive area of the image sensor.

9. The image sensor module of claim 7 including a transparent cover disposed over the image sensor, wherein the transparent cover is substantially transparent to a wavelength of radiation detectable by the image sensor, and wherein the second spacer laterally surrounds the transparent cover.

10. The image sensor module of claim 7 wherein the actuator is operable to obtain a lens focus position for the optical sub-assembly.

11. The image sensor module of claim 7 wherein the second spacer includes a continuous annular protrusion.

12. The image sensor module of claim 7 wherein the second spacer includes a multitude of protrusions.

13. The image sensor module of claim 12 wherein the protrusions are shaped as columns or studs.

14. A method of manufacturing an image sensor module, the method comprising:
providing a lens barrel sub-assembly including an optical sub-assembly disposed inside a lens barrel housing and including an actuator operable to adjust a position of the optical sub-assembly inside the lens barrel housing;
attaching the lens barrel housing directly to a spacer assembly to form a combined assembly, wherein the spacer assembly includes a spacer, and wherein attaching the lens barrel housing directly to the spacer assembly includes attaching the spacer to the lens barrel housing by adhesive, wherein the spacer includes a multitude of protrusions;
mounting the combined assembly to an image sensor sub-assembly that includes an image sensor on a printed circuit board, wherein the spacer assembly separates the lens barrel sub-assembly from the image sensor assembly, and wherein the spacer assembly includes a spacer that rests directly on an inactive area of the image sensor; and
operating the actuator to adjust a position of the optical sub-assembly inside the lens barrel housing.

15. The method of claim 14 including adjusting a length of the spacer before mounting the combined assembly to the image sensor sub-assembly.

16. The method of claim 15 wherein adjusting the length of the spacer corrects for tilt that otherwise would occur between an optical axis of the optical sub-assembly and a plane of the image sensor.

17. The method of claim 15 wherein adjusting the length of the spacer includes micromachining, cutting, dicing or grinding a free end of the spacer.

18. The method of claim 14 including operating the actuator to focus a focal-length of the optical sub-assembly on a plane of the image sensor.

19. A method of manufacturing an image sensor module, the method comprising:
mounting a lens barrel housing on walls laterally surrounding an image sensor, wherein a first spacer separates the lens barrel housing from the walls along a first axis, and wherein the first spacer is fixedly attached to the walls by adhesive;
mounting an optical sub-assembly on an inactive area of the image sensor, wherein a second spacer separates the optical sub-assembly from the image sensor along the first axis, and wherein the second spacer is fixedly attached by adhesive to the optical sub-assembly but not to the image sensor; and
operating the actuator to adjust a position of the optical sub-assembly inside the lens barrel housing.

20. The method of claim 19 including adjusting a length of the second spacer before mounting the optical sub-assembly on the image sensor.

21. The method of claim 20 wherein adjusting the length of the second spacer corrects for tilt that otherwise would occur between an optical axis of the optical sub-assembly and a plane of the image sensor.

22. The method of claim 20 wherein adjusting the length of the spacer includes micromachining, cutting, dicing or grinding a free end of the spacer.

23. The method of claim 19 including operating the actuator to focus a focal-length of the optical sub-assembly on a plane of the image sensor.

24. An image sensor module comprising:
a lens barrel sub-assembly including an optical sub-assembly disposed inside a lens barrel housing;
an image sensor;
a first spacer separating the lens barrel housing from the image sensor, wherein the first spacer is fixedly attached by adhesive to outer walls laterally surrounding the image sensor;
a second spacer separating the lens barrel sub-assembly from the image sensor, wherein the second spacer rests directly on an inactive area of the image sensor; and
an actuator operable to adjust a position of the optical sub-assembly inside the lens barrel housing,
wherein the first spacer and the second spacer are equal in length in a direction perpendicular to the image sensor.

25. An image sensor module comprising:
a lens barrel sub-assembly including an optical sub-assembly disposed inside a lens barrel housing;
an image sensor;
a first spacer separating the lens barrel housing from the image sensor, wherein the first spacer is fixedly attached by adhesive to outer walls laterally surrounding the image sensor; and
a second spacer separating the lens barrel sub-assembly from the image sensor, wherein the second spacer rests directly on an inactive area of the image sensor; and an actuator operable to adjust a position of the optical sub-assembly inside the lens barrel housing;
wherein the first spacer and second spacer are opaque at wavelengths of light detectable by the image sensor.

* * * * *